United States Patent
Gnadl et al.

(10) Patent No.: US 12,128,346 B2
(45) Date of Patent: Oct. 29, 2024

(54) PRESSURE VESSEL

(71) Applicant: LINDE GMBH, Pullach (DE)

(72) Inventors: Alexander Gnadl, Munich (DE); Verena Kramer, Munich (DE)

(73) Assignee: Linde GmbH, Pullach (DE)

( * ) Notice: Subject to any disclaimer, the term of this patent is extended or adjusted under 35 U.S.C. 154(b) by 263 days.

(21) Appl. No.: 17/595,018

(22) PCT Filed: Apr. 30, 2020

(86) PCT No.: PCT/EP2020/025199
§ 371 (c)(1),
(2) Date: Nov. 5, 2021

(87) PCT Pub. No.: WO2020/224803
PCT Pub. Date: Nov. 12, 2020

(65) Prior Publication Data
US 2022/0212136 A1    Jul. 7, 2022

(30) Foreign Application Priority Data

May 8, 2019    (EP) .................................... 19020324

(51) Int. Cl.
*B01D 53/04*    (2006.01)
*B01J 3/04*    (2006.01)
(Continued)

(52) U.S. Cl.
CPC ..... *B01D 53/0423* (2013.01); *B01D 53/0462* (2013.01); *B01J 3/042* (2013.01);
(Continued)

(58) Field of Classification Search
CPC ...... F16J 12/00; F17C 13/002; B01D 53/0462
(Continued)

(56) References Cited

U.S. PATENT DOCUMENTS 2,995,208 A     8/1961  Hachmuth et al.
3,871,313 A *   3/1975  Yamauchi ................ F16J 12/00
                                                     228/184
(Continued)

FOREIGN PATENT DOCUMENTS

FR              2974735 A1    11/2012

*Primary Examiner* — Jeffrey R Allen
(74) *Attorney, Agent, or Firm* — Millen, White, Zelano & Branigan, P.C.; Brion P. Heaney

(57) ABSTRACT

A pressure vessel comprising a cylindrical middle section, at a first end of which there is provided a top end cover, and at the second end of which there is provided a bottom end cover, the pressure vessel comprising an outer casing, wherein at least in the cylindrical middle section there is provided an insulation arrangement on the inside of the outer casing, the insulation arrangement comprising at least one insulation material layer, and a protective layer provided on the inside of the insulation arrangement, wherein at least one insulation material layer comprises a plurality of insulation material plates, especially ceramic fibre plates, and/or the protective layer comprises a plurality of protective plates, and wherein the cylindrical middle section is provided with a plurality of rings adapted to secure the at least one insulation layer and/or the protective layer to the outer casing.

16 Claims, 3 Drawing Sheets

Figure 1:
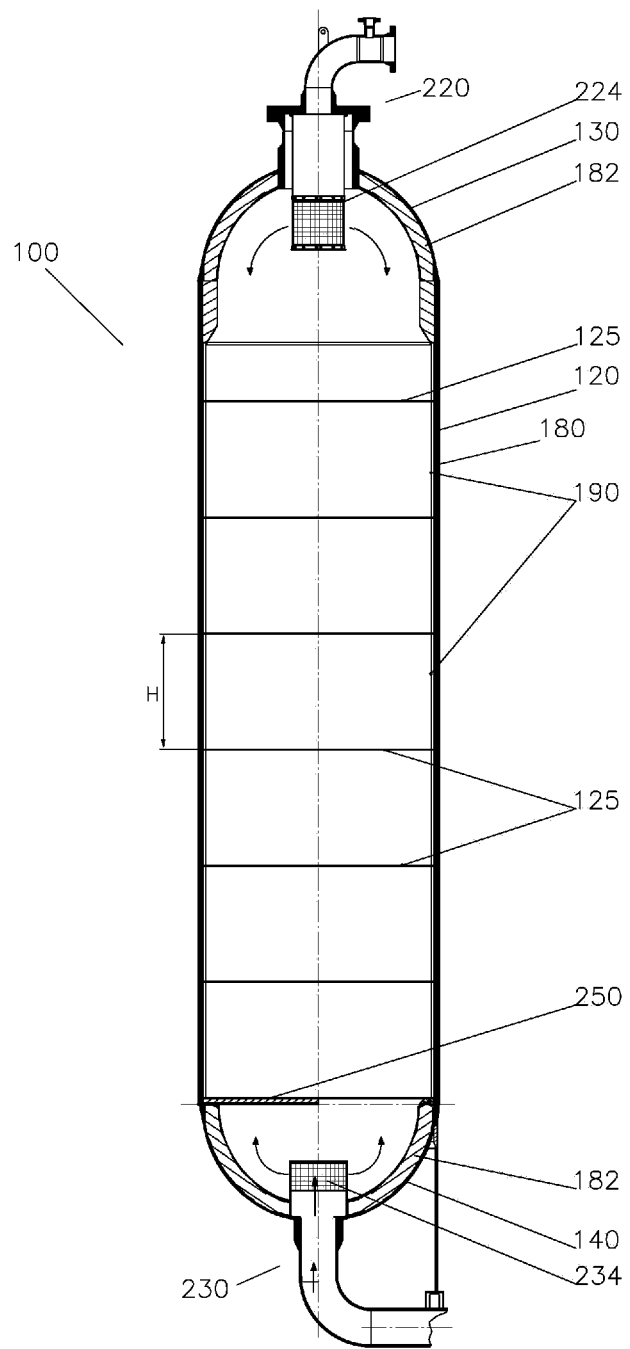

(51) Int. Cl.
*B01J 8/00* (2006.01)
*F16J 12/00* (2006.01)
*F17C 13/00* (2006.01)

(52) U.S. Cl.
CPC ............... *B01J 8/008* (2013.01); *F16J 12/00* (2013.01); *F17C 13/002* (2013.01); *B01J 2208/00495* (2013.01)

(58) Field of Classification Search
USPC .............................. 220/560.12, 62.15, 62.17
See application file for complete search history.

(56) References Cited

U.S. PATENT DOCUMENTS

| | | | |
|---|---|---|---|
| 3,925,041 A | | 12/1975 | Patterson et al. |
| 4,364,753 A | | 12/1982 | Wagner |
| 5,908,492 A | * | 6/1999 | Lehman ............. B01D 53/0407 96/144 |
| 8,308,017 B2 | * | 11/2012 | Schlag .................... F16J 12/00 220/586 |

* cited by examiner

PRESSURE VESSEL

The present invention relates to a pressure vessel for use for example in a thermal swing adsorbent plant or other cryogenic or higher temperature systems.

Temperature swing adsorption (TSA) is an adsorptive process for separating gas mixtures, in which the regeneration of an adsorbent used is effected by means of thermal energy. TSA is, for example, used in connection with exhaust gas cleaning or for processing gas mixtures such as natural gas.

In cryogenic and higher temperature systems, adsorption processes conducted within pressure vessels for example packed with an adsorbent bed comprising an adsorbent substrate are conducted until a predetermined amount of the adsorbent capacity has been used, i.e. a predetermined amount of contaminant has been adsorbed by the adsorbent. The adsorbed gas is then removed from the adsorbent, for example by rapidly reducing the pressure and/or increasing the temperature within the vessel. Because adsorption is in general a stronger function of temperature than pressure, thermal cycling is used in many situations as a regenerative means of removing adsorbed gas from the adsorbent substrate.

In many thermal swing adsorption systems this regenerative heating is carried out by flowing a stream of heated gas through the adsorbent bed. The bed is subsequently cooled by flowing a stream of cold gas through the bed. In the absence of other effects, the heat transfer involved in heating and cooling the bed poses few problems, due to the relatively high rate and turbulent gas flows characteristic of processes employing such beds. If however, there are solid metal walls containing the bed, the associated high heat capacities involved may not permit adequate heatup and cooldown of the walls within a reasonable time and/or with reasonable effort. When the bed is being used under such conditions, that portion of the bed in proximity with the vessel walls will tend to remain at a different temperature relative to the rest of the bed, being higher during cooldown and adsorption and lower during regeneration heating for appreciable lengths of the respective cycle steps. Thus, the vessel wall will act as a heat source during adsorption and as a heat sink during regeneration. The heat sink effect requires longer regeneration times in order to regenerate the adsorbent near the wall. The heat source effect causes adsorption near the wall to be weak, so that the adsorption front moves through the bed more rapidly in those areas.

For such applications it is therefore advantageous to insulate the pressure or adsorber vessels internally, for example by providing an insulating layer on the inside of the outer vessel wall. Internal insulation reduces regeneration gas demand, as the vessel walls will not be heated, and improves the regeneration of adsorbent materials close to the wall, because the temperature gradient to the wall is significantly reduced. Both effects enable more rapid and energy effective regeneration cycles, especially compared to externally insulated vessels. Internal insulation is thus especially advantageous for TSA vessels that require a short regeneration time and have high heat capacities in the vessel walls. A pressure vessel for use as a gas adsorbent vessel utilizing internal insulation is known from U.S. Pat. No. 3,925,041. According to this document, an internal insulation is provided on the inside of the casing of the vessel.

The internal insulation comprises a number of insulating layers, each made of a plurality of rigid preformed sheets abutting one another and arranged in rows and/or columns. In order to prevent gas flow into and through the insulation layers especially at gaps or transitions between abutting sheets, it is suggested in this document to bend over the edges of the sheets of a lower layer such that they extend into the gaps between the sheets of an upper layer, thereby providing gas flow barriers. Mounting and fixing such layers requires complex and precise handling, however, and is cost intensive.

The present invention seeks to provide more simple and cost effective means for preventing unwanted gas flow in and through insulation layers of an internally insulated pressure vessel.

This object is achieved with a pressure vessel comprising the features of claim 1.

According to the invention, there is provided a pressure vessel comprising a cylindrical middle section, at a first end of which there is provided a top end cover, and at the second end of which there is provided a bottom end cover, the pressure vessel comprising an outer casing, wherein at least in the cylindrical middle section there is provided an insulation arrangement on the inside of the outer casing, the insulation arrangement comprising at least one insulation material layer, and a protective layer, especially a steel layer provided on the inside of the insulation arrangement, wherein at least one insulation material layer comprises a plurality of ceramic fibre plates, and/or the protective layer comprises a plurality of protective plates, especially steel plates, and wherein the cylindrical middle section is provided with a plurality of parallel rings extending circumferentially along the inside of the outer casing and adapted to secure the at least one insulation layer and/or the protective layer to the outer casing.

The pressure vessel according to the invention has excellent insulation properties, especially compared to pressure vessels with outer insulation. The insulation arrangement can be provided with a relatively small thickness, thereby minimizing the dimensions of the pressure vessel as a whole. Advantageously, the insulation arrangement can comprise only one insulation layer. A post treatment of the insulation arrangement is not necessary. For example, in prior art solutions internal insulation provided by concrete lining, such as refractory, must be enhanced by post-installation heat treatment to achieve required concrete qualities. Such an additional treatment is not necessary according to the invention.

The risk or frequency of gas bypassing the adsorbent by passing through insulation layers from feed to product side is avoided. Also, critical longitudinal welding seams provided on the cylindrical middle section or shell section of the pressure vessel are more easily accessible for maintenance purposes. For example, insulation can easily be removed and renewed only in specified segments.

Advantageous embodiments are the subject matter of the dependent claims.

According to a preferred embodiment, a ceramic paper layer is provided between the protective layer and the insulation arrangement. Especially in case of a steel layer as protective layer, such a ceramic paper layer ensures that the layers of the insulation arrangement are not damaged by the steel layer, especially during manufacture of the pressure vessel.

Advantageously, the cylindrical middle section of the pressure vessel is provided with a plurality of fixing elements adapted to secure the protective layer, especially the steel plates, and/or the insulation arrangement, especially the ceramic fiber plates, to one another and/or to the outer casing. Such fixing elements, which can be provided for example as clips or pins can effectively interact with the rings provided on the inside of the outer casing.

Advantageously, the top end cover and the bottom end cover comprise an internal insulation arrangement comprising bricks or a refractory or an inner skirt or a flexible insulation material. Such insulation arrangements are easily adaptable to complex shapes typically used in end covers, such as spherical or elliptical dished heads.

Expediently, gas flow passage means are provided in the top end cover and the bottom end cover of the pressure vessel. These can comprise protective shields between the gas flow passages and the internal insulation provided in the end covers and/or a basket gas distributor to ensure an even distribution of gas over the whole adsorbent bed in the cylindrical middle section.

Advantageously, the adsorbent bed is provided in the cylindrical middle section of the pressure vessel.

Advantageously, the adsorbent bed can be provided on a bed support, for example a wedge wire, to ensure optimal distribution of gas flow from the bottom end section.

Preferred embodiments of the invention will now be described with reference to the accompanying drawing. Herein, FIG. 1 shows a schematically simplified side sectional view of a preferred embodiment of the pressure vessel according to the invention, FIG. 2 a more detailed sectional view of a portion of the cylindrical middle section of the pressure vessel of FIG. 1, and FIG. 3 a schematical plan view of a section of the middle section, viewed from the inside of the vessel of FIGS. 1 and 2.

A preferred embodiment of a pressure vessel according to the invention is generally designated 100. The pressure vessel 100 is of a generally cylindrical shape, and comprises a cylindrical middle section 120. At an upper end it is provided with a top end cover 130, and at a lower end with a bottom end cover 140. Top end cover 130 and bottom end cover 140 are essentially provided as spherical or elliptical dished heads. Gas flow passage means 220 are provided in the top end cover 130, and gas flow passage means 230 in the bottom end cover 140. The gas flow passage means comprise basket gas distributors 224, 234. In the lower section an inert ball filling for optimization of gas distribution may advantageously be provided.

An outer layer of the pressure vessel 100 is provided as an outer casing 180 extending over the top end cover 130, the cylindrical middle section 120 and the bottom end cover 140. The outer casing 180 is made of a metal such as carbon steel.

The top end cover 130 and the bottom end cover 140 are provided with internal insulation means on the inside of the outer casing 180. The internal insulation means in the embodiment shown are provided as bricks 182. Bricks provide an effective means of insulation, and can easily be adapted to complex shapes of the outer casing such as the dome shaped top and bottom end covers. Be it noted that the internal insulation means in the top end cover 130 and the bottom end cover 140 can also be provided for example as inner skirts, a refractory lining or as insulation plates covered with protective plates such as steel plates.

In the cylindrical section 120, a plurality of rings 125 are provided on the inside of the outer casing. These rings 125 provide a plurality of parallely extending ridges, which serve to secure an insulation arrangement 190 and a protective layer in the cylindrical section 120, as will be described in the following. These rings also serve to avoid gas bypasses though the insulation arrangement, as will also be further expanded on below.

Figure 2:
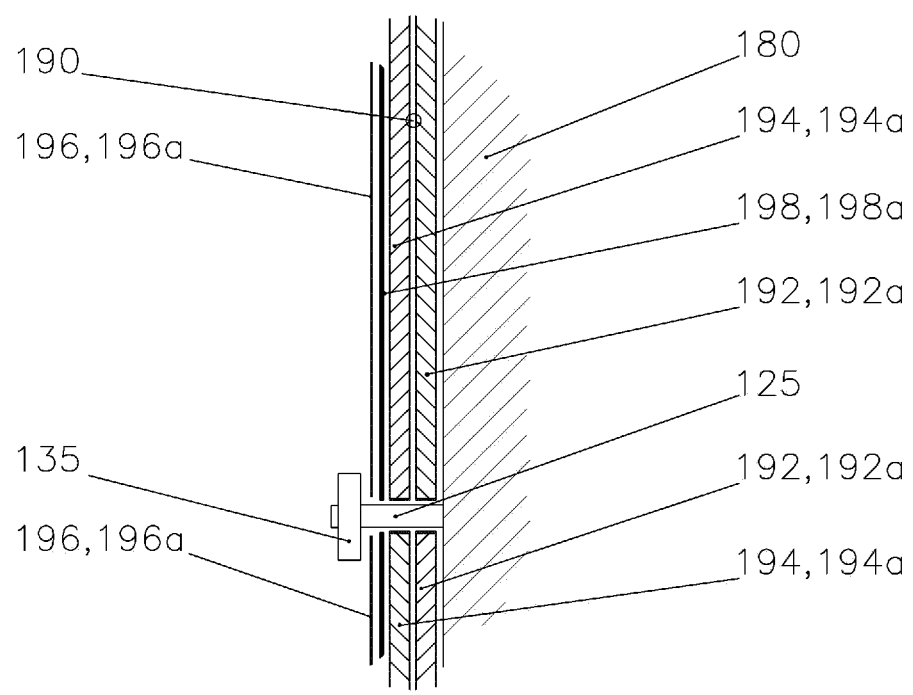

As shown especially in FIG. 2, the insulation arrangement 190 comprises a first insulation material layer 192 adjacent to the inside of outer casing 180. On the inside of first insulation material layer 192 there is provided a second insulation material layer 194.

On the inside of the second insulation material layer 194 there is provided an additional intermediate layer 198, which is preferably provided as a layer of ceramic paper.

Adjacent to the inside of the intermediate layer 198 there is provided a protective layer 196, which is advantageously provided as a steel layer. The intermediate layer 198 between the steel layer 196 and the second or innermost insulation material layer 194 serves to protect the innermost insulation material layer 194 from damage during manufacturing of the insulation arrangement 190 and/or during operation of the pressure vessel.

The insulation material layers 192, 194, the protective layer 196 as well as the intermediate layer 198 are advantageously provided in form of individual plates or sheets 192a, 194a, 196a, 198a, which are secured to the outer casing 180 with the aid of the rings 125, as will be explained in the following. Especially the plates 192a, 194a used for the insulation material layers are made of a flexible ceramic material. Such a flexible ceramic material my, for example, comprise a ceramic foam matrix, in which ceramic fibre materials are provided.

Figure 3:
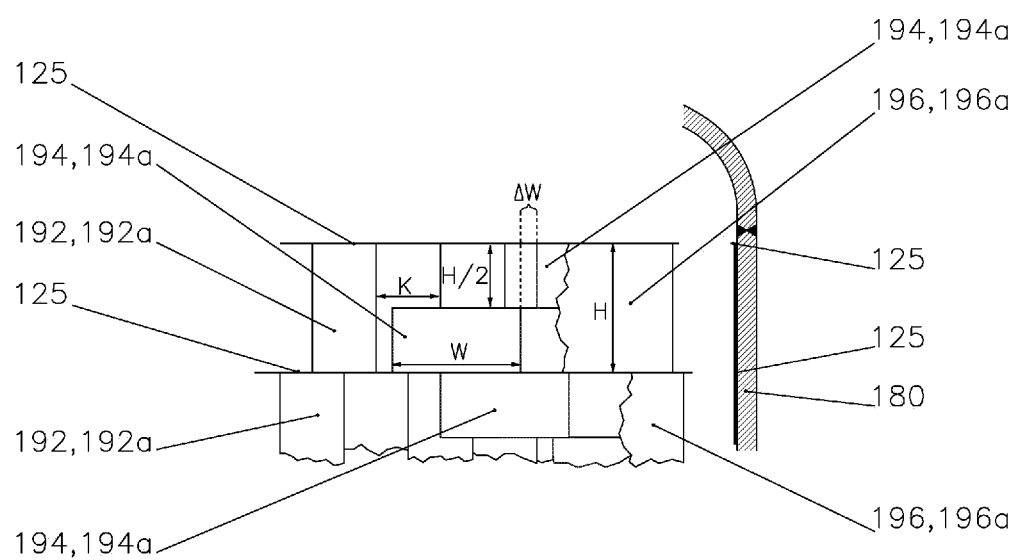

Advantageously, the axial distance H between neighbouring rings 125 can be constant over the whole cylindrical section 120. For example, the axial distance H (as shown in FIGS. 1 and 3) can be chosen to be 1000 mm. The plates/panels 192a, 194a of the insulation material layers 192, 194 and the steel layer 196, as well as of the ceramic paper layer 198 are dimensioned such that they completely cover the area on the inside of the outer casing 180 between respective neighbouring rings 125. For example, each of these panels can be provided with a height corresponding to the axial distance H between two neighbouring rings 125. Any suitable arrangement is possible, with which complete covering of this area between two neighbouring rings 125 is achieved. It is also possible, for example, that the insulation material layers 192, 194 and/or the ceramic paper layer 198 are provided with a smaller size, such that, for example two such plates have a height corresponding to the axial distance H between two neighbouring rings 125. Advantageously, the steel plates are provided with a height corresponding to axial distance H.

As is especially visible in FIG. 2, the respective plates 192a, 194a, 196a, 198a above a ring 125 can rest on this ring 125 with their lower edges. As their height corresponds to the axial distance H, they will also engage the lower side of a neighbouring ring 125 with their upper edges, as also shown in FIG. 2 for the plates 192a, 194a, 196a, 198a below the ring 125.

Advantageously, pins or clamps 135 can be provided on the inner edges of rings 125 for fixing the steel plates on the insulation plates, and thus the insulation arrangement 190 on the outer casing 180.

By means of providing rings 125, in addition to the support for the plates on the inside of the outer casing 180, as discussed, an effective deflection and/or barrier means counteracting gas bypasses between the protective steel layer 196 and the outer casing 180, i.e. through the insulation arrangement 190, can be effectively avoided. Should, for example, gas passing through the pressure vessel flow into the space between the protective steel layer 196 and a steel ring 125 and thus through the insulation arrangement 190, this flow will be interrupted at a neighbouring ring 125, so that such a gas flow bypassing the main gas flow through an adsorbent bed provided in the cylindrical section 120 can be minimized or avoided.

Be it noted that the number of insulation layers 192, 194 can be adapted according to the required insulation effect. For example, only one insulation layer can be provided between the outer casing 180 and the protective steel layer 196. Also, more than two such layers can be provided.

As is schematically shown in FIG. 3, it is advantageously possible to provide the plates of insulation material 192a, 194a in a different orientation from that of the protective steel plates 196a. For example, rectangular insulation plates 192a, 194a can be provided with a width W and a height H/2 smaller than W, such that their horizontal extension is larger than their vertical extension. As also shown in FIG. 3, for example two insulation plates 192a, 194a may be provided above one another, such that the height of two neighbouring plates 192a with height H/2 corresponds to the axial distance H between two neighbouring rings 125. Such two insulation plates 192a can also be slightly displaced from one another in circumferential direction, as indicated by displacement W.

Be it noted that in order to visualize plates 192a, 194a, 196a in FIG. 3 only parts of the respective layers are shown.

On the other hand, it is advantageous to provide the protective plates 196a with a height H and a width K such that their height corresponds to the axial distance between two neighbouring rings 125. K can be equal to H/2, and W can be equal to H, so that all plates 192a 194a, 196a are of the same size. However, different values for H/2, W and K may also be chosen.

The inside of pressure vessel 100 is filled with an adsorption bed, which is not shown in the figures. Advantageously, there is provided a bed support, for example a wedge wire 250 (shown in FIG. 1), on which the adsorbent bed can be positioned. In this case, an inert ball filling in the bottom section 140 of the vessel is not necessary.

Advantageously, the flow passage means 220, 230 comprise basket gas distributors 224, 234 and protective shields 222, 232 inserted into gas flow nozzles, as is well known in the art.

Advantageously, the nozzles are equipped with protective shields as a protective measure against thermal shocks.

LIST OF COMPONENTS

100 pressure vessel
120 cylindrical middle section
125 rings
130 top end cover
140 bottom end cover
180 outer casing
182 bricks
190 insulation arrangement
192 first insulation material layer
194 second insulation material layer
196 protective layer
198 intermediate layer (ceramic paper layer)
192a, 194a, 196a, 198a plates or sheets
220, 230 gas flow passage means
222, 232 protective shields
224, 234 basket gas distributors
250 wegde wire
H height
W, K widths

The invention claimed is:

1. A pressure vessel comprising;
an outer casing having a cylindrical middle section, a top end cover provided at a first end of the cylindrical middle section, and a bottom end cover provided at a second end of the cylindrical middle section, said outer casing having an inside surface,
wherein at least in the cylindrical middle section there is provided an insulation arrangement on the inside surface of the outer casing,
the insulation arrangement comprising one or more insulation material layers, and a protective layer is provided on an inside surface of the insulation arrangement,
wherein (a) at least one of the one or more insulation material layers comprises a plurality of insulation material plates, (b) the protective layer comprises a plurality of protective plates, or (c) at least one of the one or more insulation material layers comprises a plurality of insulation material plates and the protective layer comprises a plurality of protective plates, and
wherein the cylindrical middle section is provided with a plurality of rings that extend radially from the inside surface of the outer casing and are adapted to secure the one or more insulation layers, the protective layer, or both the one or more insulation layers and the protective layer, to the outer casing.

2. The pressure vessel according to claim 1, wherein an intermediate layer is provided between the protective layer and an innermost insulation material layer.

3. The pressure vessel according to claim 1, wherein the cylindrical middle section is further provided with a plurality of fixing elements adapted to secure the protective layer, the insulation arrangement, or both to the outer casing.

4. The pressure vessel according to claim 1, wherein the top end cover, the bottom end cover, or both, comprise an internal insulation arrangement comprising bricks or a refractory or an inner skirt or a flexible insulation material.

5. The pressure vessel according to claim 1, wherein the top end cover and the bottom end cover are provided with gas flow passage means.

6. The pressure vessel according to claim 1, wherein the protective layer is provided as a steel layer.

7. The pressure vessel according to claim 1, wherein the plurality of insulation material plates is a plurality of ceramic fiber plates.

8. The pressure vessel according to claim 2, wherein the intermediate layer is a ceramic paper layer.

9. The pressure vessel according to claim 1, wherein the cylindrical middle section is provided with a plurality of fixing elements adapted to secure the protective layer and the insulation arrangement to one another.

10. The pressure vessel according to claim 1, wherein the cylindrical middle section is provided with a plurality of fixing elements adapted to secure the protective layer and the insulation arrangement to one another and to the outer casing.

11. The pressure vessel according to claim 7, wherein the cylindrical middle section is provided with a plurality of fixing elements adapted to secure the protective plates, the ceramic fiber plates, or both, to the outer casing.

12. The pressure vessel according to claim 7, wherein the cylindrical middle section is provided with a plurality of fixing elements adapted to secure the protective plates and the ceramic fiber plates to one another.

13. The pressure vessel according to claim 7, wherein the cylindrical middle section is provided with a plurality of fixing elements adapted to secure the protective plates and the ceramic fiber plates to one another and to the outer casing.

14. The pressure vessel according to claim 1, wherein at least one of the one or more insulation material layers comprises a plurality of insulation material plates and the protective layer comprises a plurality of protective plates.

15. The pressure vessel according to claim 1, wherein the top end cover and the bottom end cover each have an internal insulation arrangement comprising bricks or a refractory or an inner skirt or a flexible insulation material.

16. The pressure vessel according to claim 3, wherein said fixing elements are clips or pins that interact with the rings that extend radially from the inside surface of the outer casing.

\* \* \* \* \*